United States Patent [19]

Smutek et al.

[11] Patent Number: 4,553,206

[45] Date of Patent: Nov. 12, 1985

[54] IMAGE STORAGE AND RETRIEVAL

[75] Inventors: John M. Smutek, Billerica; Robert I. Wenig, Lowell, both of Mass.; Nancy J. Webb, Derry; Amnon Waisman, Nashua, both of N.H.

[73] Assignee: Wang Laboratories, Inc., Lowell, Mass.

[21] Appl. No.: 538,682

[22] Filed: Oct. 3, 1983

[51] Int. Cl.⁴ .............................................. G06F 15/40
[52] U.S. Cl. .................................................... 364/300
[58] Field of Search ......... 364/200, 300, 900 MS File

[56] References Cited

U.S. PATENT DOCUMENTS 4,352,165  9/1982  Hevenor, Jr. ........................ 364/900
4,419,740  12/1983  Hevenor, Jr. ........................ 364/900

*Primary Examiner*—Raulfe B. Zache
*Attorney, Agent, or Firm*—Michael H. Shanahan

[57] ABSTRACT

An improved technique is presented for organizing digitized information for storage in a relational type tree memory structure where the digitized information is broken up into blocks of a fixed byte size which are then stored throughout the memory. A header is utilized which identifies a text or image and details of how the image was digitized and compressed, to be used in reconstructing the image properly. We also utilize an index in which is the image or text identity but also in which is an index identifying the locations throughout memory at which the blocks containing the text or image information is stored. Each block has a header identifying what text or image information is stored in the block and having the address of any another block containing realsted information for the same text or image to thereby create a chaining between the blocks by which they may all be quickly located once a first block is located using the index. A further embodiment of invention allows the storing and display of a base image containing user defined and located subfields and the selective insertion of related data or images, either previously stored or entered by the user, into the subfields. A yet further embodiment allows the use of data contained in the subfields as keys to locate and display further related information.

29 Claims, 9 Drawing Figures

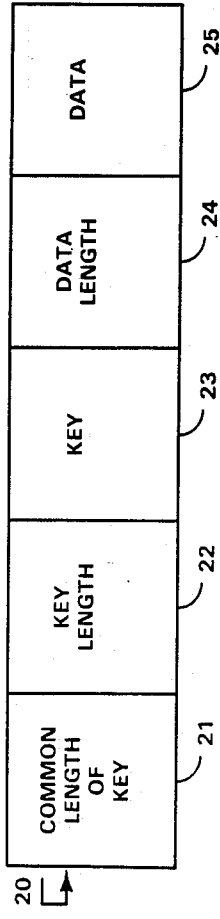
FIGURE 2. UNIVERSAL STORAGE ELEMENT
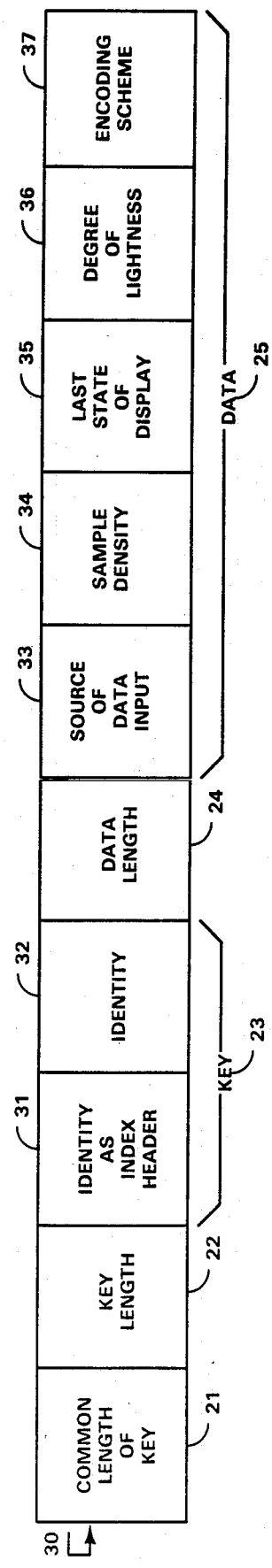
FIGURE 3. INDEX HEADER
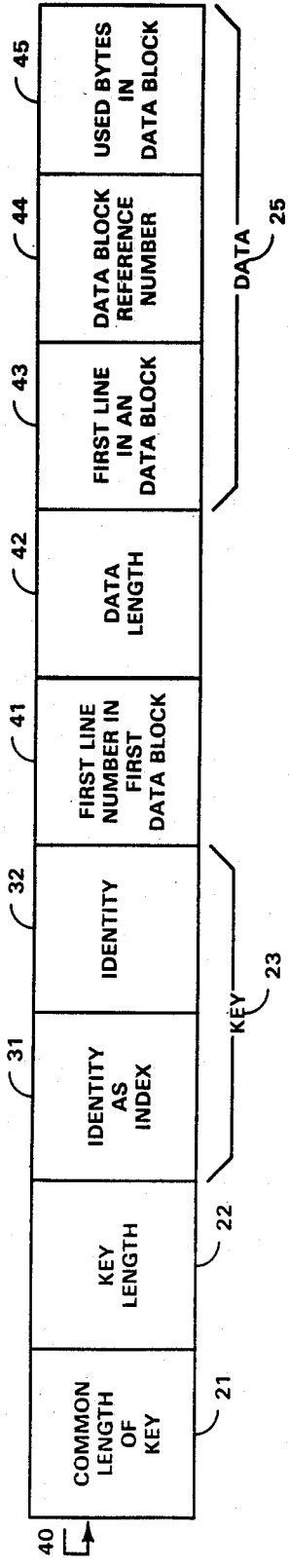
FIGURE 4. INDEX FIGURE 5. DATA HEADER
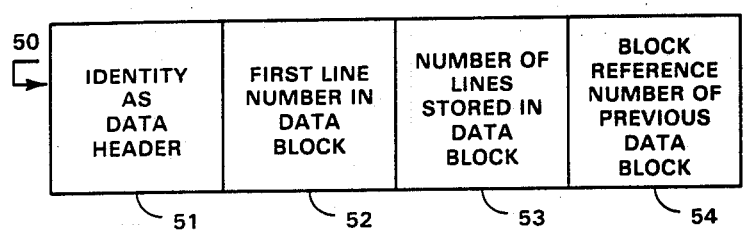
FIGURE 6. DATA
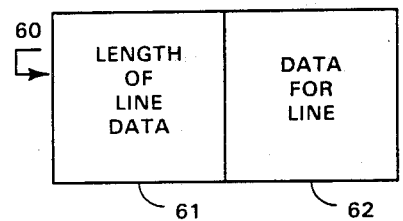

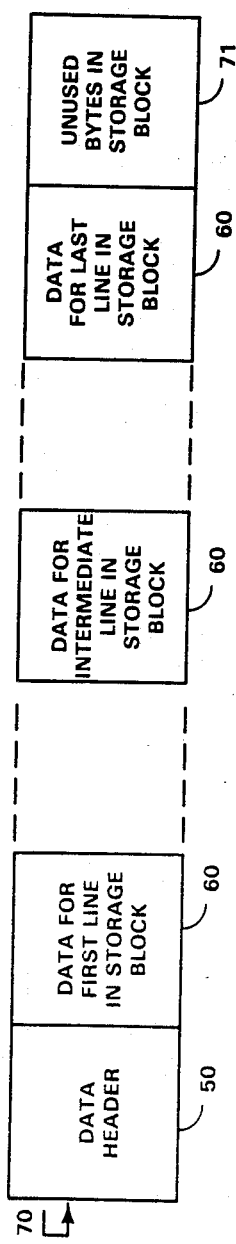
FIGURE 7. DATA STORAGE BLOCK
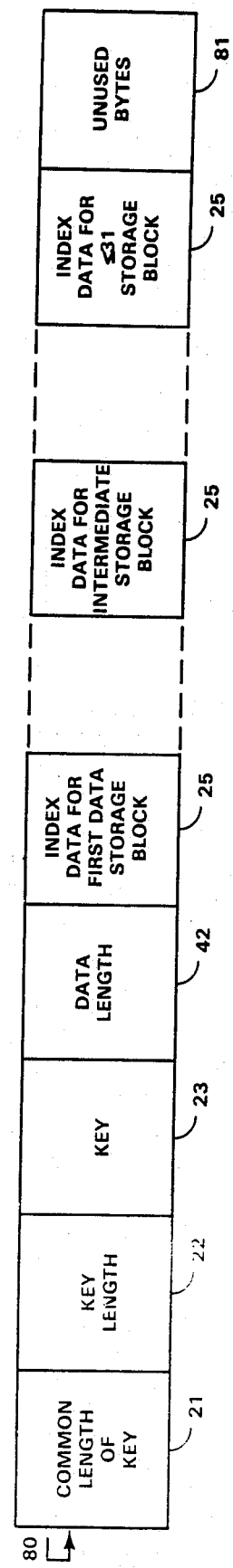
FIGURE 8. INDEX STORAGE BLOCKS

IMAGE STORAGE AND RETRIEVAL

FIELD OF THE INVENTION

This invention relates to video display terminals on which alphanumeric and graphic information are displayed and more particularly to video display terminals used in storing, retrieving and displaying information from data bases.

BACKGROUND OF THE INVENTION

In the prior art, systems having video display terminals have been utilized with other electronic equipment including mass or bulk memory in which informaton is stored in data bases and such information may be entered, retrieved and processed by an operator using a video display terminal. Such systems are widely used in many industries and businesses. One example of such use is in the insurance industry where insurance claim information is stored, processed to settle clams, analyzed to derive statistical and other business information, and to provide extremely rapid recall of previously stored informaton regarding claims or concerning an insurance holder. Another example of such use is in the medical profession. Medical and business records for private physicians and hospitals comprise much information such as patient personal information, history of treatment including hospitalization and medication, billing and payments, inventory of medical and other equipment and medicines, and information concerning medical personnel are easily updated and quickly retrievable to assist in diagnosis and treatment, billing, planning for medical equipment expenditures, equipment and plant maintenance, equipment replacement, plant expansion, and staffing, training, scheduling and replacement of medical and other personnel.

The extensive information required and generated by varied applications including those mentioned in the applications briefly described in the last paragraph are stored in large data bases that are typically made up of a number of smaller data bases. For example, in the medical field one data base is used to store medical histories, while another data base is used to store billing and payment information, yet another data base is used to store equipment inventory, maintenance and availability, and still another data base is used to store medical personnel information including work scheduling. The multiple data bases are not relationally tied together so that all information in different data bases regarding a single patient, doctor, or hospital information must be separately and laboriously retrieved.

Prior art uses of video terminals and associated equipment for the above described and many other applications are generally limited to the display of alphanumeric and sometimes graphical information. This excludes the display of much valuable information in the form of drawings, pictures and other image information which must be filed in hard form in file drawers or other filing facilities from which they must be manually retrieved and refiled. This is a time consuming approach which has improved very little over time.

Accordingly, there is a need in the prior art for equipment and techniques used with video terminals and associated equipment to quickly store and retrieve varied types of alphanumeric and graphical information in a relationally oriented data base. Such information may be represented in coded form, such as alphanumeric characters or graphic symbols represented by ASCII and other codes, or raster patterns logically comprised of rows and columns of pixels or pells, such as representations of pictures.

SUMMARY OF THE INVENTION

In accordance with the teaching of our invention we provide an improved arrangement and technique utilizing a video terminal and related equipment whereby graphics and image information such as drawings, photographs and all other forms of images are created by raster scanning the document, or by filling a bit map memory by some software program. Such images may then be easily stored, retrieved, and edited and singly or compositely displayed, with the addition of text if desired. In addition, portions of an image or portions of different images or text may be selected, retrieved and displayed, or may be selected and displayed together in a "cut-and-paste" manner but on the screen of the video terminal. A highly flexible and novel "forms fill" operation is also possible.

The use of our invention opens up many new very practical business applications that have heretofore been impossible or impractical. For example, in a realtor's office environment the standard statistical and pricing information typically entered on cards may be entered in a system including a video display terminal and bulk memory. Using data base searching techniques, the stored information regarding houses for sale may be searched to select a list of houses of possible interest based on size, cost, or location of a house using information supplied by a potential buyer. The potential buyer will then review the results of such a search and will typically select a few of the houses in the search output list for closer review. The final result is one or more houses that the potential buyer actually wants to visit. To aid the potential buyer in selecting the house(s) to visit, and to minimize the number of visits, the use of our novel method and arrangement in such a realtors office setting permits one large relationally oriented data base to include digitized information representing not only such things as the statistical data, but also such things as house floor plans, property plot plans and photographs of the outside and inside of each house. After indicating a house of interest and operating one or two additional keys on a keyboard of the video terminal the potential buyer may display the photographs and plans for each house on the display of the video terminal. By this mode of operation prospective buyers receive much more information about a house of interest than heretofore possible, and are better able to decide if they want to visit the house.

Our present invention utilizes one dimensional compression to store images wherein each image line scanned and digitized is compressed by itself without any relationship to any other digitized scan lines. As described in the detailed description hereinafter, this enables the user of a system such shown in FIG. 1 and equipped with our invention to easily store images, and then later select portions of pictures to be used as is or to be combined with text material in a composite document.

Each image that is scanned, digitized and compressed for storage and subsequent retrieval in accordance with the teaching of our invention is identified by an image identity or token. In addition, each scanned, digitized and stored image has separately stored header and index information associated therewith which has information about the image such as, but not limited to, its origonal size, its compressed size, the scanning sampling density, the image type and the coding method.

DESCRIPTION OF THE DRAWING

Our invention will be better understood upon reading the following detailed description in conjunction with the drawing in which:

FIG. 2 shows the organization of information in a universal C-BAM element used for storing information representing a digitized and stored image;

FIG. 3 shows the organization of information in block of data for an image index header regarding a stored digitized image;

FIG. 4 shows the organization of a block of data for an index of information regarding a stored digitized image;

FIG. 5 shows the organization of data for a header regarding the stored binary information representing an image;

FIG. 6 shows the organization in a block of data, of the stored binary information representing an image;

FIG. 7 shows the organization in a block of data, of the stored image data header for a stored digitized image, and the stored binary information representing the image;

FIG. 8 shows the organization in a block of data, of the image index header for a stored digitized image, and the stored index information representing same.

DETAILED DESCRIPTION

Figure 1:
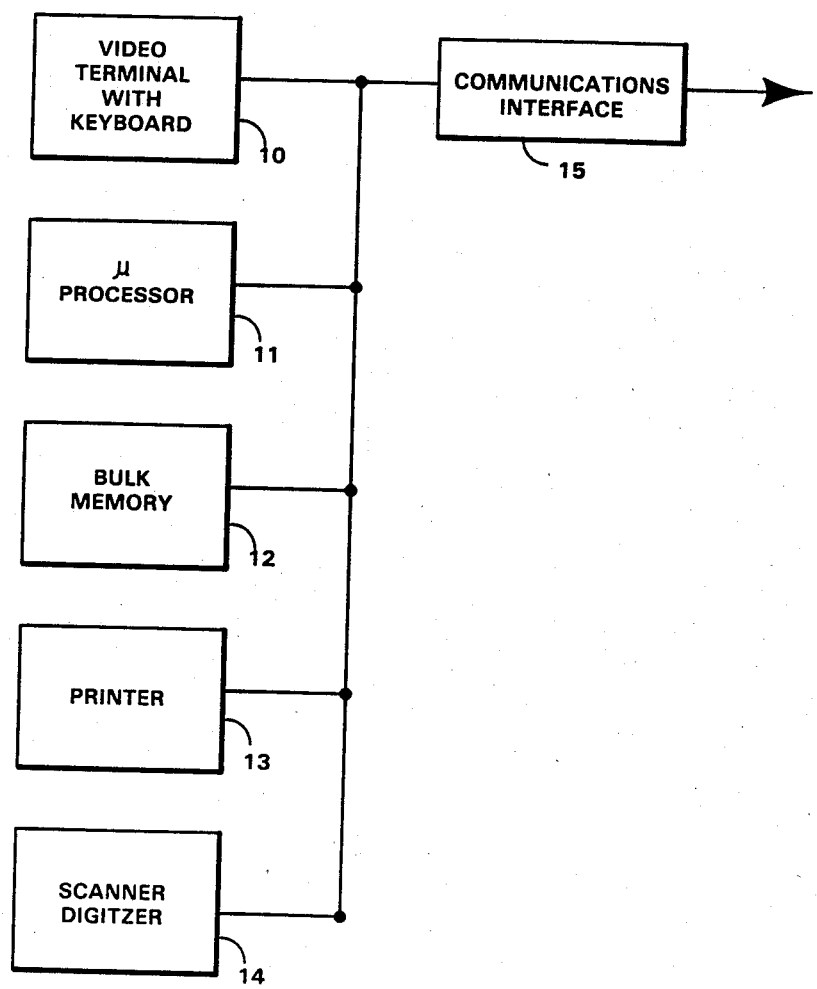
FIG. 1 is a block diagram of a display system utilizing our invention.

In implementing our invention, digitized images and any conceivable combination of alpha-numeric and non alpha-numeric information or representations are to be entered into the computer system shown in FIG. 1. A system of this type is described in U.S. patent application Ser. No. 440,668, filed Nov. 10, 1982, entitled "Management Communication Terminal System". This patent application is incorporated herein by reference. A amplified block diagram showing a system in which our invention can operate is shown in FIG. 1. It has a display system basically comprising a video terminal with keyboard 1O and microprocessor 11. A printer 12 is also provided to obtain hard copy output of what is displayed on video display 10. The system has local memory providing local storage for video display 10. Bulk memory 12, such as disk, is provided for longer term storage of larger quantities of digitized information. It is within bulk memory 12 that digitized and compressed images and text are stored and from which they are retrieved for display. The system also has a communication interface 15 which permits the system to communicate with other systems to transfer information including the images.

The system also includes a scanner/digitizer 14 which is used to scan and digitize images, such as documents or pictures to be stored in bulk memory 12. These stored digitized images are compressed and hereinafter are referred to as compressed image information. The compressed image information is stored and retrieved in accordance with the teaching of our invention.

To accomplish scanning and digitization, a document on which is an image of any kind of representation or information, including pictoral and alpha-numeric, is scanned and digitized using scanner/digitizer 14 in FIG. 1. The scanning and digitization function may be accomplished using different types of scanners such as a slow scan CCD or a vidicon camera, or other suitable raster scanning device. The resulting binary signal representing the scanned and digitized image is then to be stored in bulk memory 12. The scanning, digitization, and compression are all well known in the art and are not described in detail herein. The method or technique for storing and retrieving compressed image information representing an image or text or a combination of the two is the subject of the present invention.

When images or a document of any type are scanned and digitized for storage, and recalled for display or transmission of the image utilizing our invention, there is large quantity of digital information generated. To minimize the amount of memory required to store digitized image signals, the highly popular CCITT Group 3 facsimile compression scheme, which uses Huffman encoding, is utilized. There is much literature available in the art describing CCITT compression. This CCITT compression is available for both one-dimensional and two-dimensional data compression. That is, in one-dimensional compression each digitized scan line is compressed without any relationshp to any other digitized scan lines. With two dimensional compression, groups of digitized scan lines are collectively compressed. Two dimensonal compression yields a greater compression factor, but the stored compressed data for a number of scan lines must be decompressed in order to obtan even a portion of the digitized and compressed data therein. In the preferred embodiment of our invention one dimensional compression is utilized, wheren one scan line at a time is digitized and compressed. This does not provide the optimum of data compression for minimal storage space, but does minimize the amount of time required to retrieve the digitized image information. This enables the user of the system shown in FIG. 1, which system utilizes our invention, to easily and quickly select portions of pictures to be used as is, or to be combined with other images or text material in a composite document. However, two dimensional compression may be used.

It is to be recognized in the following description of the storing and retrieval of digitized image information, such as alphanumeric characters, are stored and retrieved in the same manner. In the place of strings of bits representing compressed image information, however, the strings of bits are bytes or codes representing alpha-numeric data. Each image that is scanned, digitized and compressed for storage and subsequent retrieval, or each body of text, is, in accordance with the teaching of our invention, stored in blocks. Each such block is identified by an image or text identification called a block reference number, which is essentially a logical address of the a block of scanned or coded data. In addition, each digitized and stored image or body of text has a separately stored administrative record associated therewith. This record includes an Index Header and an Index. The Index Header includes such information as the source of the digitized information input, the sampling density, the degree of lightness, and the encoding or compression scheme. Certain of this information is not required for text. The Index includes an index which indicates where the compressed image information or text blocks are stored in memory. Sometimes it may be necessary to randomly access and display various portions of a digitized and stored image or text, rather than the whole image or body of text.

Digitized information representing an image is created by scanning an image on a document with a scanner, or by other means of generating an image. The digitized information is compressed and stored with the information divided into blocks that are stored in a relational tree storage arrangement. A part of the present invention involves the application of relational tree structures to raster patterns.

In FIG. 2 is shown a universal storage element that is useful in understanding how we organize headers and indexes used in keeping track of 2K byte blocks of memory in which is stored compressed image information and text information in the memory tree. U.S. patent application No. 490,814, Filed May 2, 1983, entitled Sparse Array Bit Map Used Data Bases is incorporated heren by reference and it teaches data base organization. As will be described below, the information residing in each block is organized to make optimum use of the capacity of the block and each block contains information linking the block to other blocks containing related information. The compressed and digitized image or text information is stored in the same memory with the index header and the index, organized in accordance wth the teaching of our invention.

As may be seen in FIG. 2, a universal storage element has five basic components, located in blocks that are called block segments hereinafter in this specification. These block segments may also be called fields by some in the art. The block segments represent the organization or order in which information is stored, in accordance with the teaching of our invention, to achieve the benefits of storing compressed image data in 2K byte blocks or packets of information. The first block segment or packet is a Common Key Length. Common Key Length is basically discussed here but is described in greater detail further in this specification. Simply stated, if there are two or more files of stored digital information in memory, wherein a file contains all information pertaining to a single image, common key length permits compressing the file, or image, titles. The amount of memory required may therefore be minimized. The second block segment, entitled Key Length, indicates the number of bytes required to store the Key information in a third block segment. The third block segment in the universal storage element is called a Key and contans information identifying the type and identity of the compressed digitized image or text information stored in the memory tree. The fourth block segment in the universal storage element is entitled Data Length and indicates the number of bytes of binary information used to store the data in the fifth block segment. The fifth block segment in the Universal Storage Element is entitled Data and is used for two purposes. In the index header of FIG. 3 it indicates a variety of information about how an image is scanned, encoded, etcetera. In another usage, as in FIG. 4, the Data block stores address information indicating where in the memory tree the compressed image information representing the scanned, digitized, and compressed image or text is stored.

Basically then, the universal storage element stores information identifying the image or text that is stored, details regarding such things as scanning and encoding an image, and information used in locating the compressed image or text information in memory. Finally, the universal storage element utilizes a technique for minimizing the amount of storage space required to identify an image or text.

As briefly described heretofore in this specification, a document on which is located an image to be stored is scanned and digitized using software or a device such as a scanner/digitizer. The data is then compressed to reduce the required storage space. The compressed image or text information is then stored in the blocks as described below. The storage method for the image or text data is different from that used to store the administrative record. Associated with storing the compressed image or text, the system creates an Index Header, shown in FIG. 3. The Header identifies the fact that the compressed image or text information to be stored is for an image or text, identifies the particular image or text, and stores a variety of information concerning how the image or text is scanned, encoded, etcetera. Also, the system creates an Index, shown in FIG. 4. The Index identifies that the information to be stored is for an image or text, identifies the particular image or text, and stores index data identifying the blocks of memory in which the compressed image or text information is actually stored. The specific organization of the information for the Index Header, shown in FIG. 3, and for the Index, shown in FIG. 4, follows the organization of the Universal Storage Element shown in FIG. 2. The organization of the information is represented by the block segments shown in FIGS. 2 through 8.

The first two block segments of the Index are the same as shown for the Universal Storage Element and are accordingly numbered with the same reference numbers 21 and 22. The third and fourth block segments of the Index represent the key of the Universal Storage Element. In FIG. 3, the third and fourth block segments represent KEY 23 as shown. The fifth block segment of the Header, entitled Data Length 24, is the same named block segment in the Universal Storage Element. The last five block segments of the Index Header are all part of the data block segment of the Universal Storage Element. In FIG. 3, these last five block segments are grouped together and marked DATA 33–37 as shown.

In operation, the DATA portion, hereinafter called the Index Header data block, is repeated a maximum of thirty-one times for a single KEY. The system assigns, for example, sequential 2K (two thousand) byte blocks of memory, as necessary, to store 2K byte blocks of compressed image information or text. Each byte comprises eight binary bits. As the image or text is entered, the system creates an Index Header, shown in FIG. 5, and an Index, shown in FIG. 4, both of which are described further in the specification.

The system selects a first 2K byte block of memory to store the text or the compressed image data in a format shown in FIGS. 5 and 6. As one 2K byte block of memory is filled with compressed image information or text, another 2k byte block of memory is assigned. This procedure is repeated until the compressed image information or text for the entire image or body of text is stored. As compressed image information or text is being stored, index information is also stored in an Index Header 30 which indicates where the compressed image information or text is stored. Each Index can store index information for a maximum of thirty-one 2K byte blocks of memory using an equal number of Index Data Blocks. FIG. 3 only shows one Index Data Block, but FIG. 8 shows that there can be a maximum of thirty-one of these. When the maximum number of Index Data Blocks has been used for a first Index Header, a second Image Index Header is created for another maximum of thiry-one Index Data Blocks. Indexes are created as necessary to store the index for an entire image or body of text.

Each 2K byte block of compressed image information has the compressed image information stored therein organized as shown in FIGS. 5 and 6. This organization is different from that used for the administrative record. Each block of information includes a Data Header 50 as shown in FIG. 5, and, for an image, the compressed image information for each scan line has a Prefix 61 telling the quantity of compressed image information for that scan line as shown in FIG. 6. Compressed image information or text grouped as represented in FIG. 7 is placed in 2K byte blocks of memory. As one 2K byte block of memory is filled, another block of memory is assigned by the system. This process is repeated until enough 2K byte blocks of memory have been assigned and used to store the compressed image information for an entire image or body of text. As will be described further below, the 2K byte blocks are chained to other such blocks containing related information.

In the event that the image information is not compressed for any reason, the uncompressed digitized information may also be stored. In this instance the Length of Line Data of the Image Data in FIG. 6 is always the same and reflects every scanning sample in a scan line. Rather than store a large number, the quantity zero is stored in this block segment. The system knows that there is never a zero scan line data length and automatically uses the number indicating every scanning sample in a scan line.

The above is a general description of the creation of Index Headers and Indexes used to keep track of information regarding how an image is scanned, digitized, and compressed, and also to keep track of the memory locations where the compressed image information or text is stored. This method for organizing, keeping track of, and storing compressed image information or text is now described in greater detail. The following description will concentrate on the use of the present invention to store and recover image information. It should be remembered, however, that the data stored may comprise codes, such as ASCII codes representing alphanumeric characters or graphic symbols, rather than unstructured information representing an image such as a picture.

As previously mentioned, information regarding the manner in which an image is scanned, digitized and compressed is stored for the purposes of enabling the stored image information to be retrieved and displayed. This last mentioned information is stored within the DATA portion of the Index Header 30 shown in FIG. 3. The number of bytes of binary information required to store all this information is stored in the block segment 24 of the Index Header 30, entitled Data Length. The DATA portion of the Index Header, which comprises the last five block segments 33–37, stores five types of information regarding the image and how it is scanned, digitized, and compressed. The first type of information is entitled Source of Data Input 33 and identifies the type of equipment used to scan a document.

The second type of information stored in the DATA portion of the Image Index Header is entitled Sample Density 34. When a document is scanned and digitized, the scanning process creates an analog signal which is sampled and the samples are each digitized. The sampling rate along each scan line is expressed as samples per inch. A sampling rate of two hundred samples per inch, however, will create a very sharp image. In the orthogonal direction on a document on which an image is being scanned, the scanning rate is represented as scan lines per inch. Again, a scanning rate of two hundred scan lines per inch will yield a very sharp image upon display of the image from the compressed digital information representing the image.

The third type of information stored is Last State of Image 35 and indicates the angular position at which the image was last displayed. An image wll automatically be displayed at the same angular orientation that it was last displayed. On initial storage of the compressed image the data stored in ths block segment will cause the image to be displayed upright the first time it is displayed. An operator can change the orientation by making a keystroke entry to cause an angular rotation of the image.

The fourth type of information stored in the DATA portion is the Degree of Lightness 36 which indicates how dark or light the image is. Finally, the fifth type of information stored in DATA is entitled Encoding Scheme 37. It indicates the compression method. There are many encoding schemes available for use in the prior art. In the preferred embodiment of the invention the CCITT encoding is used.

The first four segment blocks of the Index Header, shown in FIG. 3, all regard what is called key information. The third block segment is entitled Identity As Image Index Header 31. Block 31 stores a binary code indicating whether the stored information is for an image or is text. Image Identity 32 identifies the specific image or text stored. An Image Identity is particularly necessary because compressed image information for a number of images can and most likely will be stored in the memory. The operator of the system will select single image at a time to be retrieved from storage for display and may concurrently display more than one image. The system uses the image identity selected by the operator from a menu or other source on the video display and converts it to a binary number which corresponds to that number stored in the Image Identity block segment 32 of the Index Header.

The first block segment 21 of the Index Header 30 is the Common Key Length. Common key length permits compressing the titles of the files. The amount of memory required may therefore be minimized. The second block segment 22 of the Index Header, entitled Key Length, indicates the number of bytes required to store the key information in the third and fourth block segments 31 and 32.

The Common Length of Key 21 and Key Length 22 block segments of the Index Header are formed in the following manner. In a storage file in which are stored a number of images or texts, the Index Headers are stored in an alphanumeric order. For example, assume that one image has an identity of WAND and the mage identity of a second image is WANG. Each of these two images will have Index Headers, Indexes and stored compressed information representing the respective images as previously described. Assuming that the image having the identity WAND has already been stored. The system looks at the title WANG of the new image to be displayed, locates the Index Header for the WAND image and determines that the first three digits WAN are common between the two images. Accordingly, the Index Header for the image file havng the image identity WANG will have a common key length of 3, representing the common characters WAN. In the first block segment 21 of the Index Header entitled Common Length of Key, the number 3 is stored indicating these three common characters, common with the previous image file having an image identity of WAND. In the fourth block segment 32 of the Index Header, entitled Image Identity, only a binary number representing the letter G is stored therein. In the third block segment 31 of the Index Header, entitled Identity As Image Index Header, is stored a single byte indicating that this compressed digitized information represents an image. In the second block segment 22 of the Index Header, which is entitled Key Length, is stored one byte of information representing the length of the key information stored in the third and fourth block segments of the Index Header. In this specific example there is one byte of information stored in the third block segment, and there is one byte of information stored in the fourth block segment representing the letter G, so the Key Length has the number two stored therein as one byte of information.

To display a stored image or a body of text, the Index Header is identified, as now described. Assume it is desired to display the image titled WANG. The Common Length of Key block segment of the Index Header indicates that there are three characters common with the identity of the previous image stored in the file. As the previous image file has an Image Identity of WAND, it is thereby understood that the letters WAN are the first three letters of the Image Identity of the file presently being looked at to read its Image Identity. Upon reading the fourth block segment of the Index Header, a byte is found therein representing the letter G, and the letter G is combined with the Common Key Length characters WAN read out of the previous file to recreate the proper Image Identity WANG.

Returning to a discussion of the storing process, in storing text or a compressed image the system creates an Image Index which is used to store addressing information identifying where the compressed image information or text is actually stored in the main memory. In FIG. 4 is shown the organization of stored information for the Index. The first four block segments of the Index include the Common Length of Key 21, Key Length 22, Identity As Image Index 31, and Image Identity 32. These block segment have the same information stored therein as the first four block segments of the Index Header described above, except that the Identity As Image Index block segment has a byte stored therein that identifies this as being an Index rather than an Index Header. Indexes are stored by the system in the main memory in alpha-numeric order, so the proper image or text identity may constructed from the key using the commom length of key technique. The fifth segment 41 of the Index 40 is entitled First Line Number In First Image Data Block. In the case of an image, the information stored in this segment is a byte indicating the scan line number whose information is compressed and stored in the first 2k byte block of assigned memory and its index information stored in the first of up to thirty-one Index Data Blocks.

The last four block segments 42-45 of the Index 40 are used to store the index of addresses of the multiplicity of 2K byte blocks of main memory whereat is stored the compressed image information representing an image or the portions of a text. In the following description, these four block segments are called a Data Block Length 42, while the last three block segments 43-45 are called DATA 25. One Index, represented as shown in FIG. 4, is able to store memory location indexing for a maximum of thirty-one 2K byte blocks of memory. To accomplish this, the last four block segments of the Index are repeated a maximum of thirty-one times, with each Index Data Block 25 containing index information regarding the memory location of an associated 2K byte block of memory. A detailed description of the block segments of the Index Data Block is found herein after the next paragraph.

FIG. 8 is entitled Index Storage Block BO and better represents the organization of the information stored in the Index shown in FIG. 4, particularly with regard to the multiplicity of Index Data Blocks 25. The first two block segments of the Index Storage Block shown in FIG. 8 are the first two block segments of the Index shown in FIG. 4. The third block segment 23, entitled Key, in the Index Storage Block of FIG. 8 represents block segments 31 and 32, also entitled KEY, in the Index of FIG. 4. The fifth block segment in the Index Storage Block of FIG. 8 is the fifth block segment of the Index in FIG. 4. Thereafter, in the Index Storage Block shown in FIG. 8, are shown three block segments separated by dashed lines. These three last mentioned block segments are all entitled Index Data For xxx Data Storage Block, and represent a first, intermediate and a last one of the Index Data Blocks shown in detail in the last four block segments of the Image Index in FIG. 4. In this manner we represent the fact that there is an Index Data Block associated with each of a maximum of thirty-one 2K byte blocks of compressed image information or text. In actual operation there will always be some number of unused bytes of storage in the Index Data Block, in which there is insufficient space to store the information representing another Index Storage Block. The number of the unused bytes of storage of the Index Data Block account to the system for unused storage space in the Index Storage Block.

Now that it is understood from a description of FIG. 8 that there are maximum of thirty-one Index Data Blocks associated with each Index in FIG. 4, each Index Data Block representing a 2K byte block of memory in which is stored a 2K byte packet of compressed image information or text. The detail each of the block segments or fields in these data blocks will now be described with reference to FIG. 4.

The last four block segments 42-45 in the Index shown in FIG. 4 are an Index Data Block 25, a multiplicity of which are utilized with each Index as previously described with reference to FIG. 8. Block segment 42 indicates the number of bytes of information stored in the last three block segments of the Index Data Block. In the case of an image, as the four block segments of the Index Data Block are repeated as described above, one for each 2K byte block of compressed image information, the number of the first scan line in the associated 2K byte block is entered into the block segment 41 of each Index Data Block entitled First Line Number in An Image Data Block. For example, in the simplified event that each 2K byte block of memory stores the compressed image information for fifty scan lines of the image, the first scan line in a first 2K byte block of memory would be scan line number one, while the first scan line in a second 2K byte block of memory would be scan line number fifty-one, the first scan line in a third 2K byte block of memory would be scan line one hundred and one, and so on.

The third block segment 44 in the Index Data Block of the Index is entitled Data Block Reference Number. A Block Reference Number identifies the address of a 2K byte block of memory used to store compressed image information or text. As a 2K byte block of memory is assigned for the storage of compressed image information or text, its identity, called a Block Reference Number, is stored in this third block segment of an Index Data Block. Accordingly, the block segment entitled Data Block Reference Number in each Index Data Block will have a different Block Reference Number stored therein. Thus, each Index Data Block contains the location, or address, for the assocated 2K byte block of memory used to store compressed image information or text. All Indexes associated with an image or text will thus contain the addresses of all 2K byte blocks of memory used to store an entire image or body text.

The last block segment 45 in each data block is entitled Used Bytes In Image Data Block and a number is entered therein which is equal to the sum of the bytes of information used in the associated 2K byte block of memory. The 2k byte blocks of memory storing compressed image information or text do not have the information stored therein in the same manner as the Index Headers and Indexes. That is, the 2k byte blocks of memory storing compressed image information or text are not organized in the manner defined by the Universal Storage Element shown in FIG. 2. The dfferent organization of this compressed image information is now described.

Each 2K byte block of memory has a Data Header 50, shown in FIG. 5, and individual compressed scan line information, or text, is represented by FIG. 6, which is titled Image Data 60. Compressed scan line information for many scan lines, or text, is actually stored in each 2K byte block of memory, FIG. 7. Each 2K byte block of memory has an Data Header 50 stored therein, followed by the Data 60 for some number of scan lines, or text, until the 2K byte block of memory is filled. In FIG. 7, the first block segment is entitled Data Header and is the four block segments 51-54 of FIG. 5. The three block segments separated by dashed lines in FIG. 7 and entitled Image Data For xxxxx Line In Storage Block, each represent the two block segments 61 and 62 of the Data block shown in FIG. 6. FIG. 6 shows the organization of the compressed image information for one scan line, and the compressed image information for a number of scan lines is stored within the Data Storage Block shown in FIG. 7. There is no fixed number of compressed scan lines, or text characters, that can be stored within an Data Storage Block. The only criterion is to fill a 2K byte block of memory as full as possible. After a 2K byte block of memory is filled, there will usually be some unused bytes of memory which are not sufficient to store another compressed scan line. A number indicating the quantity of the unused bytes is stored in the last block segment 71 of the Data Storage Block 70, as shown in FIG. 7, and entitled Unused Bytes In Storage Block.

The Data Header 50 of FIG. 5 is placed at the beginning of each 2K byte block of memory. As shown, this Data Header is made up of four types of information organized as shown by the four block segments 51-54. The first block segment 51, entitled Identity As An Image Data Header, stores one byte of information which indicates to the system whether the 2K byte block is a compressed image information storage block or contains text. The second block segment 52, entitled First Line Number In Image Data Block, stores a number identifying the line number of the first compressed scan line stored within this particular 2K byte block of memory. The third block segment 53, entitled Number Of Lines Stored In Image Data Block, contains a number indicating the number of scan lines stored withn the 2K byte block of memory. The fourth block segment 54, entitled Block Reference Number Of Prevous Image Data Block, is the Block Reference Number of the previous 2K byte block of memory which contains related image or text data, thus chaining the 2K blocks together. This enables the system to quickly and easily go from memory block to memory block in locating compressed scan line information or text.

FIG. 6, entitled Data, shows two block segments 61 and 62 representing how the compressed image information for a scan line is stored. The second block segment 62, entitled Data For Line, represents the compressed image information for one scan line. The first block segment 61, entitled Length Of Line Data, is a number indicating the number of bytes of information stored for the corresponding compressed image information for the scan line.

After mages or text are stored in accordance with the teaching of our invention, as described above, it will be desired to read the compressed image information or text out of the memory to display the image or text at some later time. The identity of the image or text, which may be alpha-numberic in nature, will usually indicate what the image portrays or the text contains, such as "floor plan" and will be listed someplace in a menu or another document. The menu may have a list of titles of images or text documents, or the title of the image or text may be listed someplace within another document that may be called up on the video display of the system, shown in FIG. 1. The operator of the system can select the image or text, no matter how listed, by placing a cursor on the identity and operating a key indicating that it is desired to display the image or text designated by the cursor. A light pen or other device may also be used for this purpose. The image or text so desgnated will then be retrieved from storage in the memory and displayed on the video display in lieu of the menu or other document prevously displayed. The operator may then perform operations on an image, such as moving the image vertically or horizontally, scaling the image size up or down to make it larger or smaller, cropping off portions of the image that are not desired to be displayed, and rotating the image. In this manner, the operator of the system may select and edit the images. In addition, the operator may select and edit other images and combine the different edited or unedited images or text in a single screen display. The images called up for display may be alpha-numerc document images or a mixture of pictoral and alpha-numeric information. The operator may also mix edited images with alphnumeric text information entered in a conventional word processing or other manner in a composite display.

Once the operator of the system has selected a given image or text to be retrieved from memory from a menu of images or text or on another document, the system translates the title of the image or text, for example, WANG, to an image or text identity. Knowing that an image or text is desired to be read out of memory and the image or text identity, the system searches through memory, first looking through the key information in Index Headers until the Header for the desired image or text. The Index Header information is read out and used for processing compressed image information soon to be read out of the memory for display. The system searches through Keys in Indexes for the particular Indexes for the desired file. With the Block Reference Numbers in the Indexes for the selected image or text, the system can then address and read out the compressed image or text information whereever it is stored in the memory. As mentioned previously, different images read out of memory may be edited and combined, and even mixed with alpha-numeric information for a composite display of the two.

In the editing function, the operator may specify that the entire image or a part thereof be displayed. The DATA portion of an Index Header, shown in FIG. 3, is used to instruct the system how to process the compressed image information to restore the image for display. If the system operator only wants to select a portion of an image for display, the portion, for example, being a slice across the image, they so indicate this operation to the system by key manipulations on a keyboard associated with the video display. The key manipulations identify the beginning scan line and the end scan line of the slice. By way of example, if the desired image slice begins on scan line five-hundred and ends on scan line one-thousand, and there are fifteen-hundred scan lines for the entire image, only the middle one third portion of the image will be read out of memory and be displayed. To do this, the system first searches through the Index Data Blocks for the information stored in the block segment entitled First Line In An Image Data Block until it locates the Index Data Block(s) containing the Block Reference Numbers for the 2K byte blocks of memory in which is stored the desired image slice. The system uses the located Block Reference Numbers to address the 2K byte blocks of memory containing the compressed scan line information for the desired image slice. The compressed image information for the desired scan lines is then decompressed and further processed to create the signal used to display the desired image portion on the video dsplay.

Once the system has located all 2k byte blocks containing the compressed image information for the desired slice, the system begins to locate in each 2K byte block of memory the desired data. To do this, it bypasses Data Header 50 in each 2K byte block and goes to the first Image Data For First Line Storage Block 60, as shown in FIGS. 6 and 7, which identifies the number of bytes used to store information in the first data block therein. This information in turn may then be used to determine the location of the second data block, and so on until the start of the desired information is located, for example, the beginning scan line of the image slice. Ths process is repeated for all scan lines of interest until the desired portion of the image has been displayed. More specifically, with our example, the compressed image information for scan lines five-hundred through one-thousand are located, read out, decompressed, processed and that portion of the image displayed.

A further embodiment of the above described invention allows, as described below, the storing and display of a Base Image 100 containing user defined and located Subfields 102 and the selective insertion of related data or images, either previously stored or entered by the user, into the subfields. A yet further embodiment allows the use of data contained in the subfields as keys to locate and display, for example, further related data or images, digitized and stored voice documents a video disc recording or other data forms.

Figure 9:
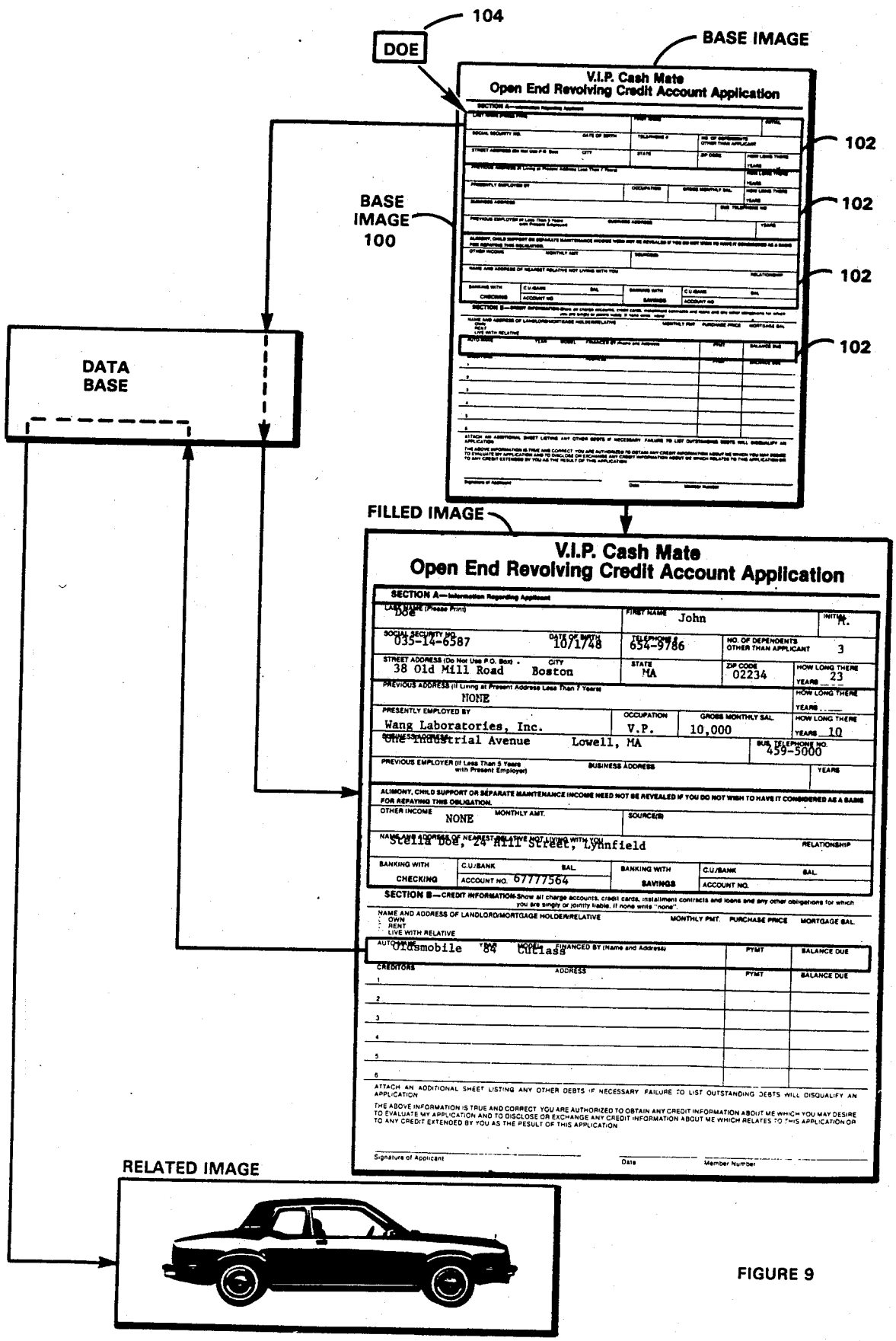
FIG. 9 is a diagramatic illustration of a method for generating a base image having fields for the selectable insertion of information and for selecting and displaying related information by using the image fields as keys to the related information.

An exemplary application of ths further embodiment is illustrated in FIG. 9, wherein the stored Base Image 100 is, for example, a blank insurance form. The stored image may be originally obtained through the use of an image camera system to scan, digitize and store an image of an actual form or picture as described in U.S. patent application No. 440,668, previously referenced. Alternately, the image may be created using a computer graphics function.

As indicated in FIG. 9, the Base Image 100 contains one or more blank Subfields 102 defined and located by the user wherein information about, for example, a particular client, may be displayed. It should be noted that the subfields illustrated in FIG. 9 are, for purposes of clarity of presentation, actually comprised of several subfields as they would actually appear in the embodiment. For example, referring to the topmost subfield of the illustration, there would be separate subfields 104 for Last Name, First Name, Initial, Social Securty No., Date of Birth, Dependents, Address, City, State, ZIP Code, and Years Resident.

The blank subfields 102 are entered into the base image by inserting identifiers defining the subfields into data blocks. The subfield identifiers will be located in the data blocks in a manner relating and corresponding to the locations at which they are to appear in the base image. That is, the locations of the identifiers in the data blocks wll relate to the corresponding points in the image information residing in image blocks at whch they are to appear. Each identifier will be uniquely identified.

The ability of the present data base display system described above to rapidly and easily insert or edit information stored therein. This ability to insert and edit an indentifier allows a user to easily position and move the subfields as desired without disturbance to other subfields on the base image.

Associated with each such subfield will be information describing, for example, the dimensions of the subfield and, in certain embodiments, information identifying the class of information to appear therein. The classes of information appearing therein may include alphabetic characters, images, and graphic symbols. In certain embodiments, for example in the present illustration, the information associated with each subfeld may also identify the specific type of information to appear therein, for example, a name, address, phone number, picture of a client, and insured values. The subfelds initially do not, however, contain specific information about, for example, a particular client but, as described above, are blank subfelds.

The user may, using the information retrieval system described above, 'fill in the blanks' to display, for example, information concerning a particular client. The information concerning the particular client is read from the image or data blocks containing that information and by association through the Image or Text Identifiers referring to the particular subfields, is displayed in the corresponding subfields. The relational data retrieval system described above is used, in this operation, to relate the base image as read from the system and the points therein where subfields are to appear to another porton of the data system containng the subfield identifiers. The information associated with the subfield identifiers is in turn used relationally to obtain specific information to appear in each subfield.

In the illustrated embodiment, the information display operation is initiated by entering information relating to a particular client or group of clients into a blank subfield. The retrieval system then uses the provided information to locate, as described above, the stored information related to the provided information. A user may, for example, enter a name, phone number or address of a client into an appropriate blank subfield appearing in the base image and all related information will appear in the subfields of the image. A user may also enter, for example, a part of a name, such as 'Smi'; the system will then display in succession the related information for each client having a name beginning with the letters 'Smi'. The information retrieval system described above allows the user to enter new information into or to delete or modify old information appearing in the record appearing in the 'filled in' base image.

The information retrieval system described above further allows the contents of a 'filled in' subfield to be used as a Identifier to locate and display, for example, other related images, data or voice messages. In the present example, the user may indicate a particular subfield, for example, by moving a cursor or highlighter, containing information regarding accident claims. The information associated with that particular subfield will then be used to locate and display, for example, a stored image of a photograph of an accident or a stored image of an original, handwritten accident report.

In a yet further embodiment, the use of subfields to locate related information or images allows the use of 'locator' subfields. Such subfields are not used for the actual display of data or images but are used solely to locate and display related information or images. For example, the base image may comprise an aerial view of a portion of countryside. The subfields imposed therein may delineate certain areas of the countryside shown in the base image, for example, certain houses or buildings. The subfield identifiers may then be used to locate and display, for example, photographic images of the structures or areas ndicated by the subfields.

In an alternate example, the image may comprise, for example, a page of a book with certain words, phrases or illustrations appearing therein delineated by subfields. The subfields may then be used to locate and display further information or images relating to topics selected by the user through the delineating subfields.

In a yet further embodiment of the present invention, the base and subfield images and images located through the subfields may be still or motion images stored on, for example, video disc. The image so displayed to a user may then have all of the capabilities of a televison or motion pcture image, that is, the user could view a motion picture of an event or an animated graphics display.

What we claim is:

1. A method of storing digital information representing an image comprising the steps of:
   storing said digital information in a plurality of blocks,
   for each block creating an index containing information including the storage location for the block, and
   creating an index header for the indexes containing information including image identity, wherein the structure of the image information in the blocks is different from that of the indexes and header.

2. The method in accordance with claim 1 wherein said step of storing said digital information in blocks further includes the step of chaining the blocks together by inserting header information for chaining said blocks together.

3. The method in accordance with claim 2 wheren said chaining step includes the step of inserting a block reference number of another block.

4. The method in accordance with claim 3 wherein the chaining step further includes the step of storing the identification of the first element stored in each block.

5. The method in accordance with claim 4 wherein the chaining step further includes the step of storing the number of elements stored in each block.

6. The method in accordance with claim 5 wherein the chaining step further includes the step of identifying the block as storing image data.

7. The method in accordance with claim 1 further comprising the step of identifying the quantity of digital information stored in the block.

8. The method in accordance with claim 1 wherein the step of creating an index header further includes the step of storing information for reconstructing the image from the digital information.

9. The method in accordance with claim 8 wherein the step of creating an index header further includes the step of compressing the image identity therein.

10. The method in accordance with claim 9 wherein the step of compressing the image identity further includes the steps of:
    storing information the quantity of the image identifier shared with other image identifiers, and
    storing information identifying the portion of the image identifier differing from the other image identifiers.

11. The method in accordance with claim 1 wherein the step of creating an index further includes the step of storing the identification of the first element stored in each block.

12. The method in accordance with claim 11 wherein said index includes information identifying the image and including the step of creating an index further includes the step of compressing the image identity therein.

13. The method in accordance with claim 1 wherein the step of creating an index further includes the step of compressing the image identity further includes the steps of:
    storing information the quantity of the image identifier shared with other image identifiers, and
    storing information identifying the portion of the image identifier differing from the other image identifiers.

14. The method in accordance with claim 1 further comprising the steps of:
    retrieving the digital information stored in said blocks, and
    reconstructing said image from said digital information retrieved from said blocks.

15. The method in accordance with claim 14 wherein the step of retrieving said digital information comprises the steps of:
    retrieving said index using said image identity to get the storage location of each of said blocks, and using said storage locations for locating said blocks to retrieve the digital information for said image therefrom.

16. The method in accordance with claim 15 wherein the step of retrieving said digital information further comprises the step of retrieving said index header using said image identity to get said information used for reconstructing the image from said digital information.

17. The method in accordance with claim 16 wherein the step of retrieving said digital information further comprises the step of retrieving said index header to get the information for reconstructing said image using the digital information retrieved from said blocks.

18. The method in accordance with claim 17 further comprising the step of retrieving said index header to get the information for reconstructing the image from the digital information stored therein.

19. A method for generating a base image containing subfields for the insertion of information, comprising the steps of:
  storing information representing the base image in image blocks,
  storing information indentifying the locations of the image blocks in an index, and
  storing identifiers uniquely identifying the subfields and the types of information to appear therein in the blocks in a manner relating and corresponding to the positions at which the subfields are to appear in the base image.

20. The method of claim 19 further comprising a method for storing information to appear in the subfields, comprising the steps of:
  storing the information and information relating the information to the type of information to appear in blocks, and
  storing information identifying the locations of the blocks in the index.

21. The method of claim 20, further comprising a method for selecting and displaying the information in the subfields, comprising the steps of:
  writing into a subfield of the base image an identifying portion of at least a part of the information to be appear therein,
  using the identifying portion of information as an identifier to locate in the index the locations of related information to be displayed in the subfields, and
  writing the information to be displayed into the subfields of the base image.

22. The method of claim 21, further comprising a method for selecting and displaying information related to information displayed in the subfields, comprising the steps of:
  storing the related information in blocks and information identifying the locations of the related information blocks in the index,
  selecting and reading information from a subfield,
  using the read subfield information as an identifier to locate in the index the related information, and
  displaying the related information.

23. The method of claim 17, wherein the related information is an image.

24. The method of claim 21 wherein the information to be displayed in an image field is alphanumeric data.

25. The method of claim 21 wherein the information to be displayed in an image field is an mage.

26. The method of claim 19, wherein the image containing fields is a representation of a document.

27. The method of claim 22, wherein the related information is an animated image.

28. The method of claim 22, wherein the information displayed in an image field is a delineator identifying a portion of the displayed image having related information.

29. The method of claim 23, wherein the related information is an image.

* * * * *